(12) United States Patent
Busch

(10) Patent No.: US 6,520,588 B1
(45) Date of Patent: Feb. 18, 2003

(54) SEAT BELT GUIDE

(75) Inventor: Craig A. Busch, Armada, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 4 days.

(21) Appl. No.: 09/714,678

(22) Filed: Nov. 16, 2000

(51) Int. Cl.[7] .............................................. B60R 22/26
(52) U.S. Cl. ....................................... 297/483; 280/808
(58) Field of Search ................................ 297/483, 473, 297/468, 464, 486, 485, 484, 482; 280/808, 801.2, 801.1

(56) References Cited

U.S. PATENT DOCUMENTS

| | | | |
|---|---|---|---|
| 4,549,749 A | | 10/1985 | Thomas |
| 5,020,856 A | | 6/1991 | George |
| 5,022,677 A | | 6/1991 | Barbiero |
| 5,088,794 A | | 2/1992 | Iwami et al. |
| 5,306,044 A | | 4/1994 | Tucker |
| 5,441,332 A | | 8/1995 | Verellen |
| 5,544,917 A | | 8/1996 | Loxton et al. |
| 5,556,171 A | | 9/1996 | Busch |
| 5,599,070 A | | 2/1997 | Pham et al. |
| 5,609,396 A | | 3/1997 | Loxton et al. |
| 5,658,051 A | * | 8/1997 | Vega et al. ................... 297/483 |
| 5,716,073 A | * | 2/1998 | Redman ................... 280/801.1 |
| 5,722,732 A | | 3/1998 | Haidenwanger |
| 5,730,499 A | | 3/1998 | Salisbury, Jr. |
| 5,733,013 A | * | 3/1998 | Brown ......................... 297/483 |
| 5,826,946 A | * | 10/1998 | Matthews et al. ...... 297/452.27 |
| 5,988,758 A | | 11/1999 | Heintzelman et al. |
| 6,120,061 A | * | 9/2000 | Ito .............................. 280/808 |

* cited by examiner

Primary Examiner—Peter M. Cuomo
Assistant Examiner—Stephen Vu
(74) Attorney, Agent, or Firm—Tarolli, Sundheim, Covell, Tummino & Szabo L.L.P.

(57) ABSTRACT

An apparatus (10) includes a guide assembly (52), a guide member (120) supported by a base member (80) for rotation about an axis (200), and an opening (140) through which a seat belt (20) extends in a first direction parallel to the axis. A retainer member (180) has end walls (184 and 186) extending through respective channels (160 and 162) in the guide member (120) to block the guide member from movement in opposite directions along the axis (200) and maintain the guide member supported on the base member (80). The channels (160 and 162) include walls (166 and 170) that engage the end walls (184 and 186) to block movement of the guide member (120) in opposite directions along the axis (200).

12 Claims, 6 Drawing Sheets

SEAT BELT GUIDE

FIELD OF THE INVENTION

The present invention relates to a guide for guiding a seat belt in an apparatus for restraining a vehicle occupant.

BACKGROUND OF THE INVENTION

A typical occupant restraint system for a vehicle includes a seat belt that has opposite ends anchored to the vehicle and is extensible about the occupant. Intermediate the ends, the seat belt extends through a tongue assembly and a guide assembly. The seat belt is drawn across the vehicle occupant and the tongue assembly is connected to a buckle to maintain the seat belt extended across the occupant. The guide assembly helps to position the seat belt across the occupant. In the event of sudden deceleration, such as occurs in a vehicle collision, the seat belt helps to restrain the occupant against movementrelative to the vehicle.

SUMMARY OF THE INVENTION

In accordance with the present invention, an apparatus for restraining a vehicle occupant in a seat of a vehicle includes a seat belt that is extensible about the vehicle occupant. The apparatus also includes a guide assembly for helping to position the seat belt around the vehicle occupant. The guide assembly includes a guide member that is rotatable relative to the vehicle seat about an axis. The guide member has an opening through which the seat belt extends in a first direction parallel to the axis. The guide assembly also includes a base member that has a support portion on which the guide member is supported for movement about the axis. The guide assembly further includes a retainer member that blocks the guide member from movement in opposite directions along the axis and maintains the guide member supported on the support portion for movement about the axis.

The guide member has a length and first and second opposite end portions spaced apart along the length. The first end portion includes a first channel for receiving a first end wall of the retainer member. The second end portion includes a second channel for receiving a second end wall of the retainer member. The first and second channels are movable relative to the first and second end walls when the guide member moves about the axis. The first channel includes first side walls that engage the first end wall to block movement of the guide member in opposite directions along the axis. The second channel includes second side walls that engage the second end wall to block movement of the guide member in opposite directions along the axis.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE PREFERRED EMBODIMENTS

Figure 1:
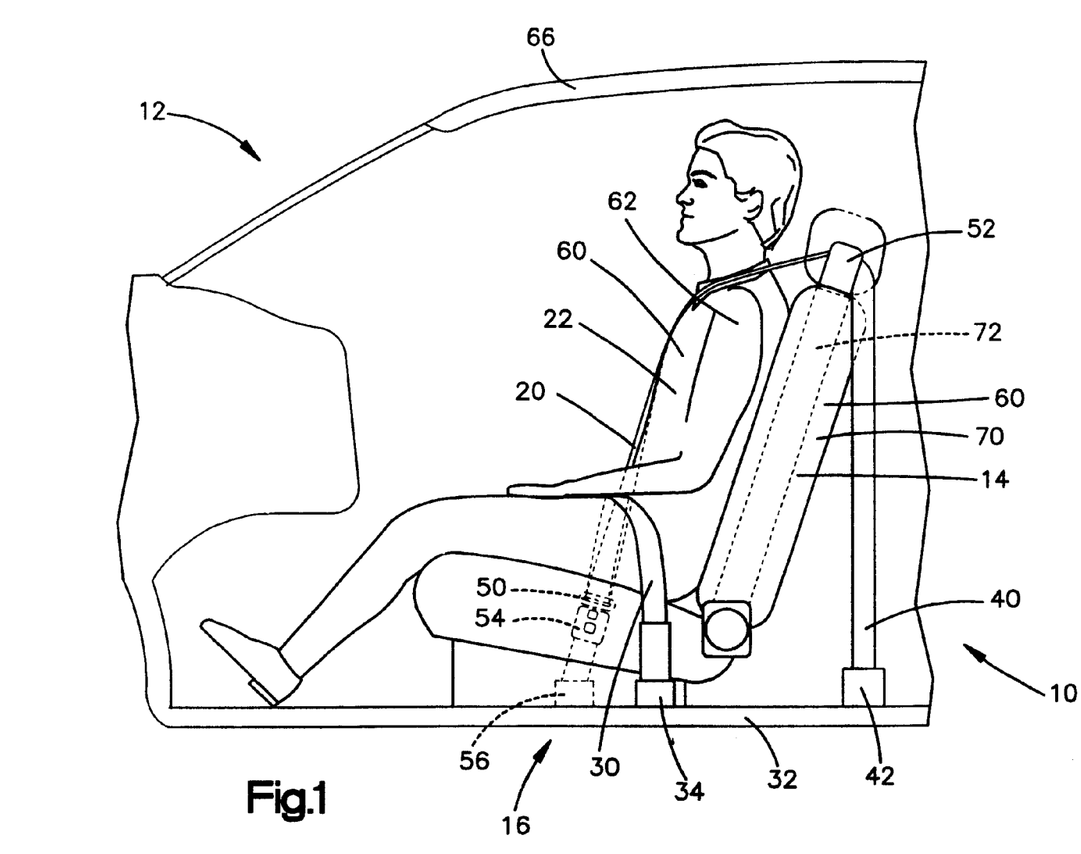
FIG. 1 is a schematic side view of an apparatus for restraining a vehicle occupant in a vehicle seat, according to a first embodiment of the present invention.
Figure 2:
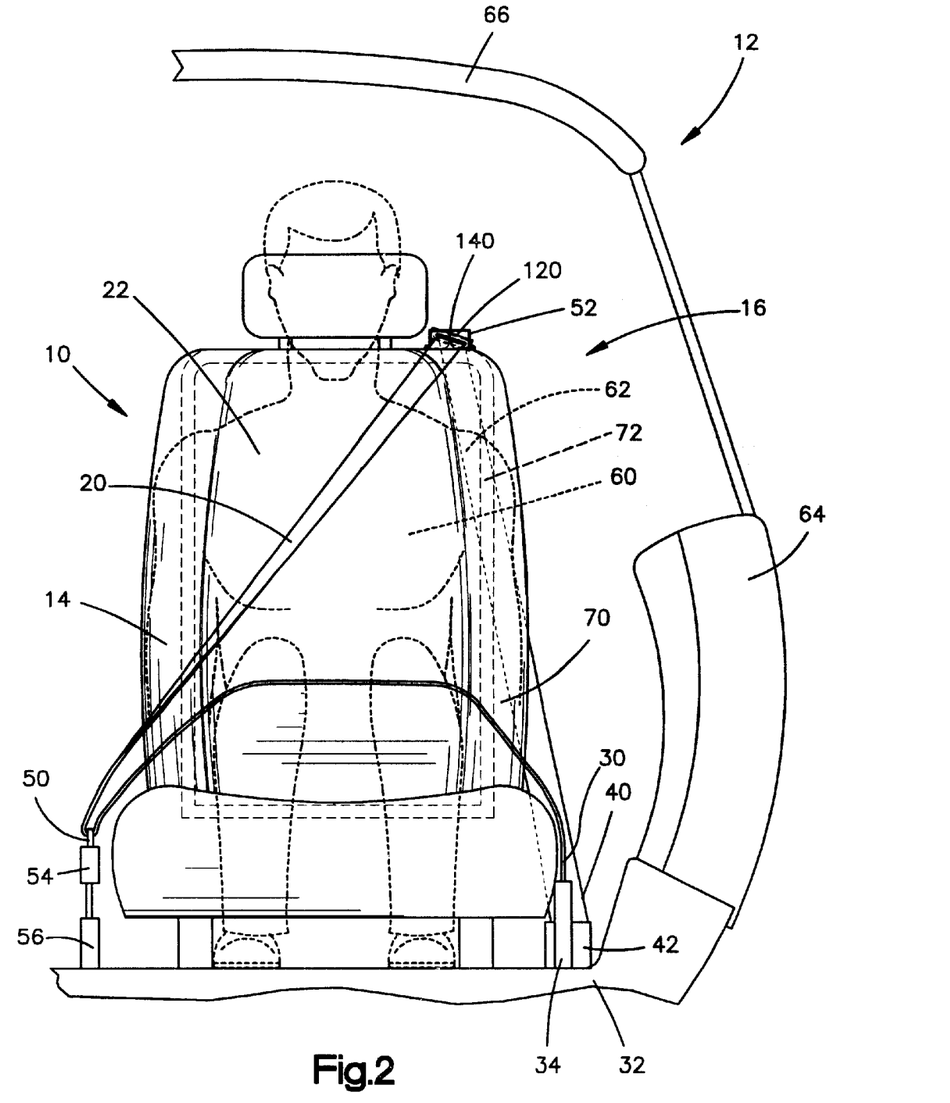
FIG. 2 is a schematic front view of the apparatus of FIG. 1.

The present invention relates to an apparatus 10 for restraining an occupant of a vehicle 12. As illustrated in FIGS. 1 and 2, the vehicle 12 includes a seat 14 and a restraint system 16 for restraining a vehicle occupant 22 in the seat. The restraint system 16 includes a seat belt 20.

The seat belt 20 comprises a length of webbing that is extensible about the vehicle occupant 22. A first end 30 of the seat belt 20 is anchored to the vehicle body 32 at an anchor point 34 located on one side of the seat 14. An opposite second end 40 of the seat belt 20 is attached to a retractor 42, which is usually secured to the vehicle body 32 on the same side of the seat 14 as the anchor point 34.

Intermediate the first and second ends 30 and 40, the seat belt 20 passes through a tongue assembly 50 and a guide assembly 52. The guide assembly 52 is located above the retractor 42 and the anchor point 34. When the seat belt 20 is not in use, the seat belt is wound on the retractor 42, as known in the art. To use the seat belt 20, the tongue assembly 50 is moved across the seat 14, around the vehicle occupant 22, and connected with a buckle 54. The buckle 54 is connected to the vehicle body 32, on a side of the seat 20 opposite the anchor point 34, by an anchor plate 56.

As illustrated in FIGS. 1 and 2, the guide assembly 52 is positioned generally above a torso 60 of the vehicle occupant 22, adjacent or near a shoulder 62 of the occupant. The guide assembly 52 is connected to a seat frame 72 of the vehicle seat 14 on a backrest 70 of the seat. The seat frame 72 provides a strong and reliable support for the guide assembly 52. Those skilled in the art will recognize, however, that the guide assembly 52 may be positioned at alternative locations in the vehicle 12 that are above the occupant's torso 60 and adjacent or near the shoulder 62. For example, the guide assembly 52 may be positioned on a side structure 64 (FIG. 2) of the vehicle 12, such as on a B pillar (not shown) of the vehicle or near the intersection of the side structure and a roof 66 of the vehicle.

Figure 3:
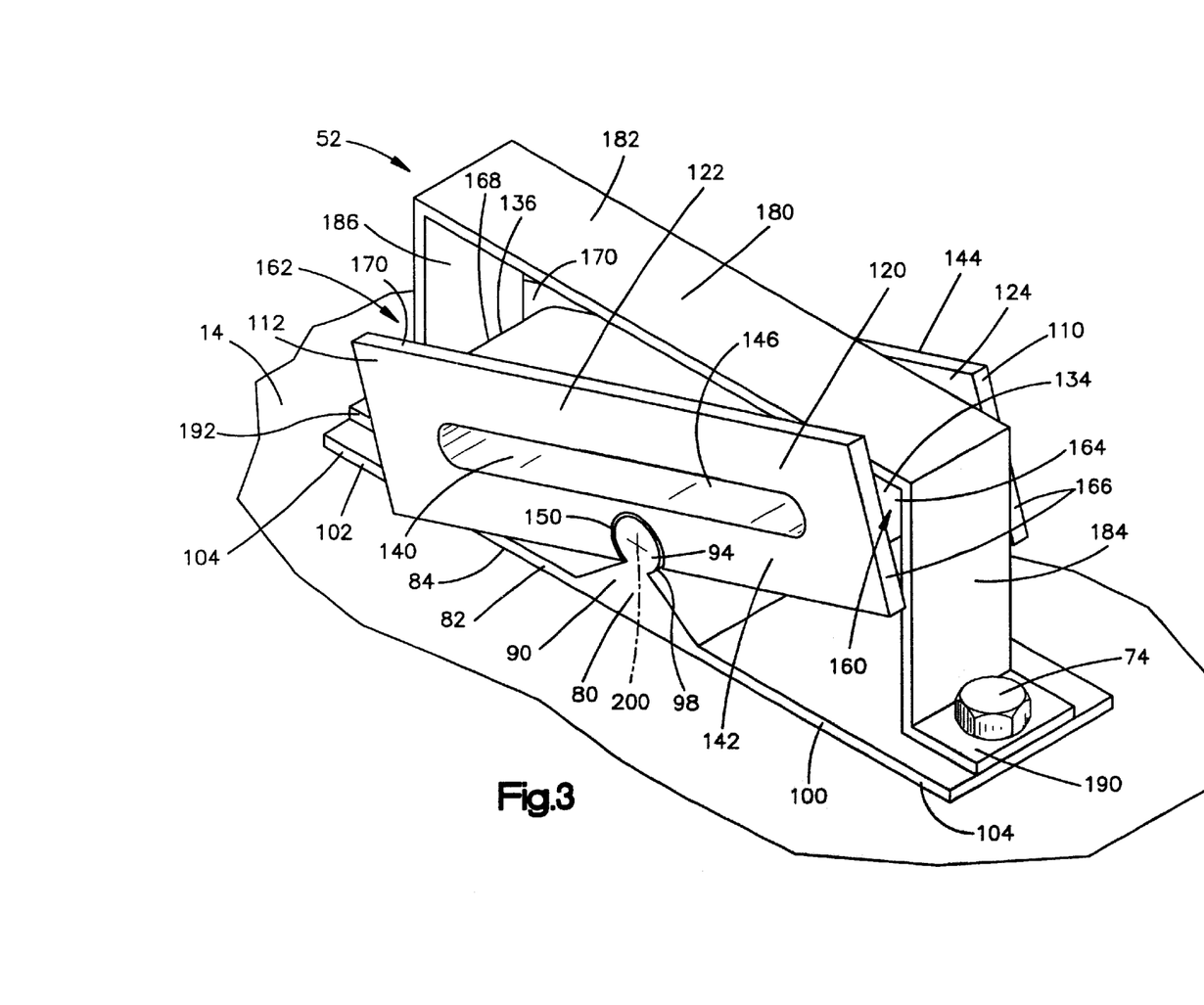
FIG. 3 is an perspective view of a portion of the apparatus of FIG. 1.
Figure 4:
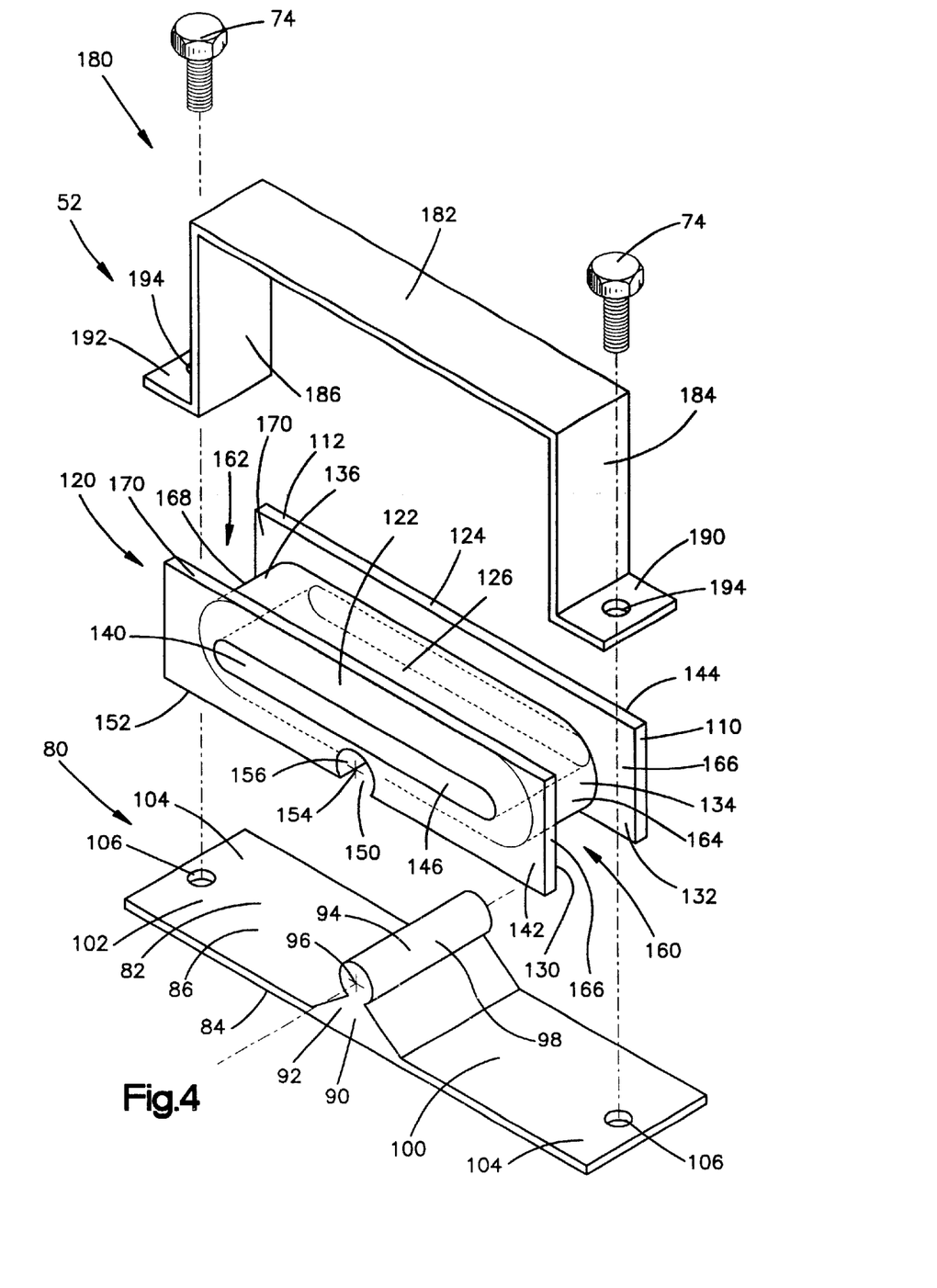
FIG. 4 is an exploded view of the portion of the apparatus of FIG. 3.

Referring now to FIGS. 3 and 4, the guide assembly 52 includes a base member 80, a guide member 120, and a retainer member 180. A pair of fasteners 74 connect the guide assembly 52 to the vehicle seat 14. The fasteners 74 extend through the retainer member 180 and the base member 80 and into the seat 14, where the fasteners engage the seat frame (not shown in FIGS. 3 and 4).

The base member 80 is preferably constructed of a plastic material. The base member 80 (FIG. 4) has a generally elongated rectangular bottom portion 82 with a lower surface 84 and an opposite upper surface 86. The lower surface 84 engages the vehicle seat 14 (FIG. 3) when the guide assembly 52 is connected to the seat. A support portion 90 (FIG. 4) extends upward from the upper surface 86 of the base member 80. The support portion 90 includes a base portion 92 having a generally triangular cross-section and a top portion 94 having a semi-cylindrical outer surface 98 positioned on top of the base portion. The top portion 94 has a central longitudinal axis 96 that is positioned generally parallel to the upper surface 86 and extends perpendicular to the length of the base member 80. The outer surface 98 extends about the axis 96.

First and second portions 100 and 102 of the bottom portion 82 extend laterally from opposite sides of the support portion 90. The first and second portions 100 and 102 each have an end portion 104 that includes an aperture 106 for receiving one of the fasteners 74 that connect the guide assembly 52 to the vehicle seat 14 (FIG. 3).

The guide member 120 is preferably constructed of a plastic material. The guide member 120 (FIG. 4) includes opposed first and second rectangular side portions 122 and 124, respectively, that are spaced apart from each other. A center portion 126 extends between the first and second side portions 122 and 124, from an inner surface 130 of the first side portion 122 to an inner surface 132 of the second side portion 124. The guide member 120 has a length measured along the longer of the rectangular dimensions of the first and second side portions 122 and 124. First and second opposite end portions 110 and 112 of the guide member 120 are spaced apart along the length of the guide member.

The center portion 126 is generally elongated in the same manner as the rectangular side portions 122 and 124, but has first and second opposite rounded end portions 134 and 136, respectively. The center portion 126 is also shorter in length and narrower in width than the first and second side portions 122 and 124. The first and second side portions 122 and 124 and the first and second end portions 134 and 136 help to define first and second channels 160 and 162, respectively, in the first and second end portions 110 and 112 of the guide member 120.

The first channel 160 includes a first base wall 164 defined by the first end portion 134 of the center portion 126 and a pair of first side walls 166 that extend perpendicularly from the first base wall at opposite ends of the first base wall. The first side walls 166 are defined by portions of the first and second side portions 122 and 124 that extend beyond the first end portion 134 of the center portion 126. The second channel 162 includes a second base wall 168 defined by the second end portion 136 of the center portion 126 and a pair of second side walls 170 that extend perpendicularly from the second base wall at opposite ends of the second base wall. The second side walls 166 are defined by portions of the first and second side portions 122 and 124 that extend beyond the second end portion 136 of the center portion 126.

An elongated guide slot 140 extends through the guide member 120, from an outer surface 142 of the first side portion 122 to an outer surface 144 of the second side portion 124. The guide slot 140 is defined by a generally smooth guide surface 146 that extends through the guide member 120. The guide surface 146 may be contoured such that the guide surface extends along a curved or arc-shaped path between the outer surface 142 of the first side portion 122 and the outer surface 144 of the second side portion 124.

The guide member 120 includes a central channel 150 that extends through the guide member 120, perpendicular to the length of the guide member, from the outer surface 142 of the first side portion 122 to the outer surface 144 of the second side portion 124. The central channel 150 is positioned below the guide slot 140 and adjacent a lower edge 152 of the guide member 120 and is centered along the length of the guide member. The central channel 150 has a central longitudinal axis 154 and is defined by a semi-cylindrical surface 156 of the guide member 120 that extends around the axis. Preferably, the surface 156 extends more than 180 degrees around the axis 154.

The retainer member 180 is preferably constructed of a high strength material, such as steel. The retainer member 180 includes an upper wall 182 and first and second end walls 184 and 186, respectively, that are spaced apart and parallel to each other. The first and second end walls 184 and 186 extend perpendicularly from opposite ends of the upper wall 182. First and second flange portions 190 and 192 extend from the ends of the first and second end walls 184 and 186, respectively, opposite the ends at the intersections of the end walls and the upper wall 182. The first and second flange portions 190 and 192 extend perpendicularly outward from the first and second end walls 184 and 186. Each of the flange portions 190 and 192 includes an aperture 194 for receiving one of the fasteners 74 that connect the guide assembly 52 to the vehicle seat 14.

When the guide assembly 52 is in the assembled condition illustrated in FIG. 3, the base member 80 is positioned on the vehicle seat 14 with the lower surface 84 of the base member engaging the seat. The guide member 120 is supported on the top portion 94 of the support portion 90. The retainer member 180 is positioned over the guide member 120 such that the upper end wall 182 is spaced above the base member 80, extending generally parallel to the base member. The first end wall 184 of the retainer member 180 extends through the first channel 160, between the first side walls 166 and adjacent the first rounded end portion 134. The second end wall 186 of the retainer member 180 extends through the second channel 162, between the second side walls 170 and adjacent the second rounded end portion 136.

The first and second flange portions 190 and 192 (FIGS. 3 and 4) of the retainer member 180 overlie the end portions 104 of the first and second portions 100 and 102, respectively, of the base member 80. The apertures 194 on the first and second flange portions 190 and 192 are aligned with the apertures 106 on the first and second portions 100 and 102. Thus, the fasteners 74 may extend through the apertures 194 and 106 to connect the retainer member 180 and the base member 80 to the vehicle seat 14.

The diameter of the central channel 150 in the guide member 120 may be generally equal to or slightly larger than the diameter of the top portion 94 of the support portion 90. This creates an interference fit or a slight clearance fit between the guide member 120 and the base member 80. In either instance, the guide member 120 may rotate on the support portion 90 relative to the vehicle seat 14. When the guide member 120 is positioned on the support portion 90, the axis 154 (FIG. 4) of the guide member and the axis 96 of the top portion 94 are positioned in a generally coaxial manner and share a common axis 200 (FIG. 3). The guide member 120 thus may rotate about the axis 200.

The surface 156 that defines the central channel 150 extends more than 180 degrees around the top portion 94 of the support portion 90 and thus connects guide member 120 to the support portion. The connection between the guide member 120 and the support portion 90 is such that the guide member may rotate about the axis 200. The guide member 120 could also slide on the support portion 90 in a direction parallel to the axis 200. Such sliding movement of the guide member 120 is blocked, however, by the first and second end walls 184 and 186 of the retainer member 180. Specifically, the first end wall 184, being disposed in the first channel 160, engages the first side walls 166 of the first channel to block sliding movement of the guide member 120. The second end wall 186, being disposed in the second channel 162, engages the second side walls 170 of the second channel to block sliding movement of the guide member 120. Therefore, when the guide assembly 52 is in the assembled condition of FIG. 3, the guide member 120 is connected to the vehicle seat 14 and may rotate only about the axis 200 relative to the seat.

The seat belt 20 extends through the guide slot 140 in a first direction parallel to the axis 200. The seat belt 20, extending through the guide slot 140 in the guide member 120, is thus connected to the seat 14 by the guide assembly 52. The seatbelt 20 may slide through the guide slot 140. The retainer member 180 cooperates with the base member 80 to connect the guide member 120 to the vehicle seat 14. The retainer member 180 and the base member 80 thus support the load on the seat belt 20, during normal operation of the vehicle. In an event such as a vehicle collision or rollover, the seat belt 20 may place high loads on the guide assembly 52. The retainer member 180, being made of a high strength material, is able to withstand seat belt loads associated with such crash or rollover situations and thus helps to maintain the position of the seat belt around the occupant.

During operation of the vehicle 12 (FIGS. 1 and 2), the occupant 22 usually has the tongue 50 connected with the buckle 54. The retractor 42 produces a tension force on the seat belt 20, which acts on the occupant 22. The tension in the seat belt 20 pulls down on the occupant 22, causing the seat belt to fit snugly around the occupant. As the seat belt 20 is drawn around the occupant 22 or moves with the occupant, the seat belt slides through the guide assembly 52.

In normal use of the restraint system 16, when the vehicle 12 is not experiencing a crash or rollover, the amount of tension in the seat belt 20 will be relatively low. This is because the retractor 42 is designed to apply force to the seat belt 20 that will cause the seat belt 20 to fit comfortably, rather than tightly, around the vehicle occupant 22.

As illustrated in FIG. 2, the seat belt 20 extends through the guide slot 140 in the guide member 120 of the guide assembly 52. Depending on the physical dimensions of the occupant 22 of the vehicle 12, the seat belt 20 will extend at different angles relative to the seat 14 when the seat belt is extended around the occupant. The angle of the seat belt 20 relative to the vehicle seat 14 will also change when the occupant 20 changes position in the seat. This tends to twist or fold portions of the seat belt 20 adjacent the occupant 22, which may cause discomfort to the occupant. According to the present invention, the guide member 120 rotates relative to the seat 14 to help to prevent portions of the seat belt 20 adjacent the occupant from becoming twisted or folded.

Figure 5:
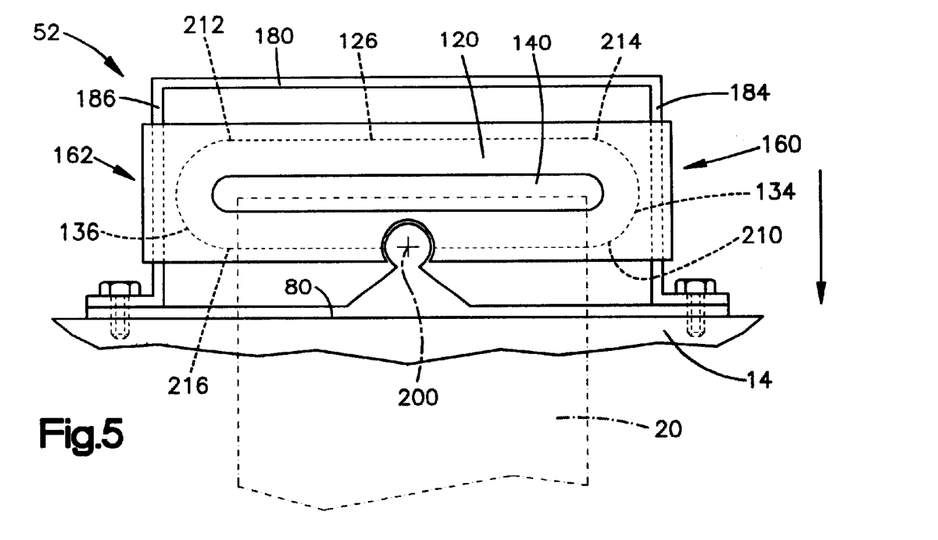
FIG. 5 is a schematic front view of the portion of the apparatus of FIG. 3.
Figure 6:
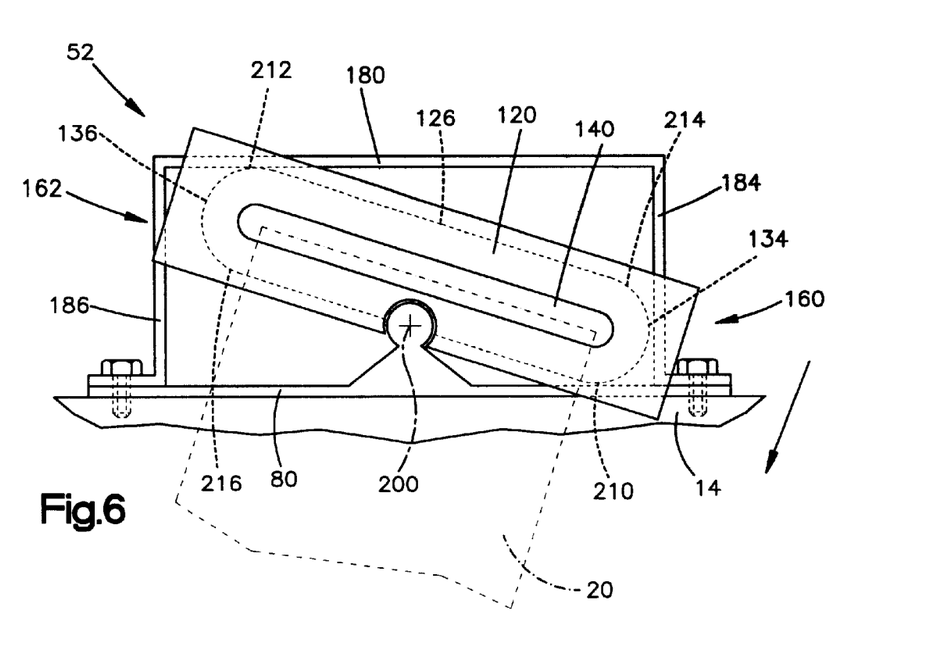
FIG. 6 is a schematic front view of the portion of the apparatus of FIG. 3 showing parts in different positions.
Figure 7:
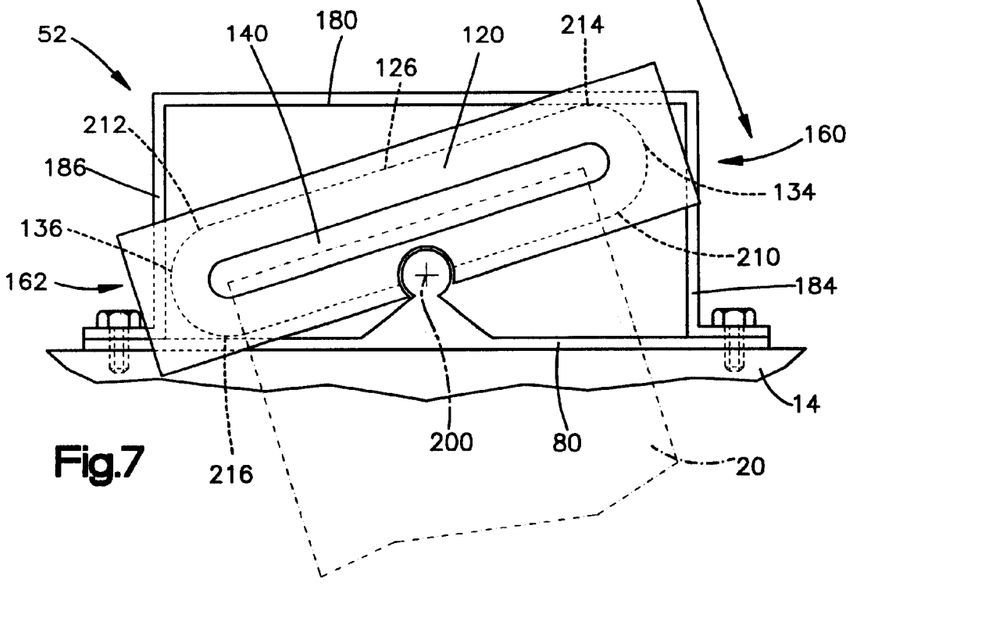
FIG. 7 is a schematic front view of the portion of the apparatus of FIG. 3 showing parts in different positions.

Referring now to FIGS. 5–7, the guide assembly 52 is illustrated in different conditions in which the guide member 120 is urged to rotate in different directions by the seat belt 20. The different conditions illustrated in FIGS. 5–7 are produced when the seat belt 20 is tensioned in different directions relative to the vehicle seat 14.

FIG. 5 illustrates the seat belt 20 being tensioned in a downward direction as viewed in the drawing and relative to the vehicle seat 14. The downward direction is indicated generally by the arrow in FIG. 5. Since the seat belt 20 is tensioned in a downward direction, the guide member 120 is not urged to rotate relative to the vehicle seat 14. Thus, the guide member 120 is maintained in a center, non-rotated position. When the seat belt 20 is tensioned in the downward direction, the seat belt can slide easily through the guide slot 140 without twisting or folding.

FIG. 6 illustrates the seat belt 20 being tensioned in a first diagonal direction, generally downward and to the left as viewed in the drawing and relative to the vehicle seat 14. The first diagonal direction is indicated generally by the arrow in FIG. 6. The tension on the seat belt 20 in the first diagonal direction urges the guide member 120 to rotate relative to the seat 14 about the axis 200 in a clockwise direction as viewed in FIG. 6. When the seat belt 20 is tensioned in the first diagonal direction, the seat belt can still slide through the guide slot 140 without twisting or folding.

As the guide member 120 rotates, the first and second channels 160 and 162 move relative to the first and second end walls 184 and 186, respectively. The first and second end portions 134 and 136 of the center portion 126, having curved outer surfaces, do not engage the first and second end walls 184 and 186 and, thus, do not block rotation of the guide member. As the guide member 120 rotates in the clockwise direction, first and second portions 210 and 212 of the center portion 126 eventually engage the base member 80 and the retainer member 180, respectively, which blocks further rotational movement of the guide member.

FIG. 7 illustrates the seat belt 20 being tensioned in a second diagonal direction, generally downward and to the right as viewed in the drawing and relative to the vehicle seat 14. The second diagonal direction is indicated generally by the arrow in FIG. 7. The tension on the seat belt 20 in the second diagonal direction urges the guide member 120 to rotate relative to the seat 14 about the axis 200 in a counterclockwise direction as viewed in FIG. 7. When the seat belt 20 is tensioned in the second diagonal direction, the seat belt can still slide through the guide slot 140 without twisting or folding.

As the guide member 120 rotates, the first and second channels 160 and 162 move relative to the first and second end walls 184 and 186, respectively. The first and second end portions 134 and 136 of the center portion 126, having curved outer surfaces, do not engage the first and second end walls 184 and 186 and, thus, do not block rotation of the guide member. As the guide member 120 rotates in the counterclockwise direction, third and fourth portions 214 and 216 of the center portion 126 eventually engage the retainer member 180 and the base member 80, respectively, which blocks further rotational movement of the guide member.

The guide assembly 52 (FIGS. 1 and 2) thus facilitates positioning of the seat belt 20 around the vehicle occupant 22 in the vehicle seat 14. The rotational movement of the guide member 120 relative to the seat 14 helps to prevent twisting or folding of the seat belt 20, which helps to provide a more comfortable fit with the occupant 22. The retainer member 180 cooperates with the base member 80 to help secure the seat belt 20 to the vehicle seat 14 and to help support loads on the seat belt during normal periods of use and during a vehicle crash or rollover situation.

Figure 8:
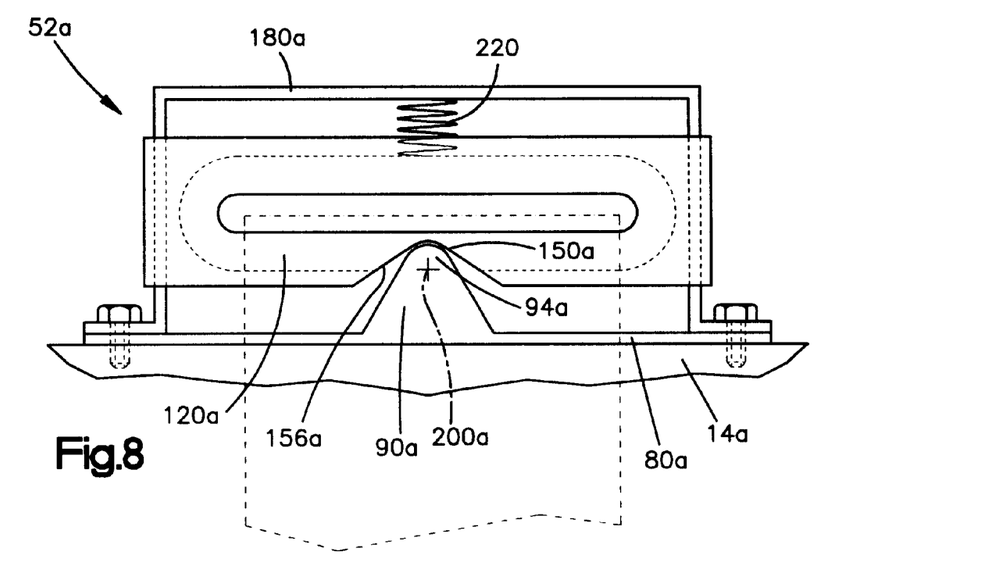
FIG. 8 is a schematic front view of a portion of an apparatus for restraining a vehicle occupant in a vehicle seat, according to a second embodiment of the present invention.

A second embodiment of the present invention is illustrated in FIG. 8. The second embodiment of the invention is similar to the first embodiment of the invention illustrated in FIGS. 1–7. Accordingly, numerals similar to those of FIGS. 1–7 will be utilized in FIG. 8 to identify similar components, the suffix letter "a" being associated with the numerals of FIG. 8 to avoid confusion. The guide assembly 52a of the second embodiment is identical to the guide assembly 52 (FIGS. 1–7), except that the base member 80a and the guide member 120a (FIG. 8) of the second embodiment have different configurations than the base member 80 and the guide member 120 (FIGS. 1–7) of the first embodiment.

As illustrated in FIG. 8, the central channel 150a of the guide member 120a extends less than 180 degrees. The support portion 90*a* of the base member 80*a* has a generally triangular cross-section. The upper portion 94*a* of the support portion 90*a* comprises a rounded portion of the triangular support portion and is not cylindrical. Thus, the surface 156*a* that defines the central channel 150*a* does not extend around the support portion 90*a* to connect the guide member 120*a* to the base member 80*a*. Instead, the guide assembly 52*a* includes a spring 220 that biases the guide member 120*a* onto the support portion 90*a* and maintains the guide member on the support portion for rotational movement relative to the seat 14*a*.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining a vehicle occupant in a seat of a vehicle, said apparatus comprising:

a seat belt that is extensible about the vehicle occupant; and a guide assembly connectable to the vehicle for helping to position said seat belt around the vehicle occupant, said guide assembly comprising:

a guide member rotatable relative to the vehicle seat about an axis, said guide member having an opening, said seat belt extending in a first direction parallel to said axis through said opening;

a base member, said base member including a support portion on which said guide member is supported for movement about said axis; and a retainer member, said retainer member blocking said guide member from movement in opposite directions along said axis and maintaining said guide member supported on said support portion for movement about said axis, said guide member having a length and first and second opposite end portions spaced apart along said length, said first end portion including a first channel for receiving a first end wall of said retainer member, said second end portion including a second channel for receiving a second end wall of said retainer member, said first and second channels being movable relative to said first and second end walls when said guide member moves about said axis, said first channel being at least partially defined by first side walls that engage said first end wall to block movement of said guide member in said opposite directions along said axis, said second channel being at least partially defined by second side walls that engage said second end wall to block movement of said guide member in said opposite directions along said axis.

2. The apparatus as defined in claim 1, wherein said guide member includes a surface that defines a semi-cylindrical central channel and said base member includes a support portion having a semi-cylindrical outer surface that extends about said axis, said channel being channel receiving said support portion, and said surface that defined said central channel being in abutting engagement with said outer surface of said support portion to support said guide member on said support portion for movement about said axis.

3. The apparatus as defined in claim 2, wherein said surface that defines said central channel extends more than 180 degrees around said outer surface of said support portion to connect said guide member to said support portion.

4. The apparatus as defined in claim 2, wherein said support portion and said central channel are centered on said axis.

5. The apparatus as defined in claim 1, wherein said opening is positioned vertically above said support portion.

6. The apparatus as defined in claim 1, wherein said opening is positioned vertically above said axis.

7. The apparatus as defined in claim 1, further comprising a spring that biases said guide member into abutting engagement with said support portion.

8. The apparatus as defined in claim 1, wherein said base member and said retainer member are connectable to the vehicle seat.

9. The apparatus as defined in claim 8, wherein said base member and said retainer member are connectable to a seat frame of the vehicle seat.

10. The apparatus as defined in claim 8, wherein said base member and said retainer member are connectable to a top portion of a back rest of the vehicle seat.

11. The apparatus as defined in claim 1, wherein said opening in said guide member comprises a slot extending along the length of said guide member, said slot being defined by an inner surface, said seat belt being slidable on said inner surface in said first direction.

12. The apparatus as defined in claim 1, further including a seat belt tongue connected to said seat belt, and a seat belt buckle connectable to the vehicle, said seat belt buckle receiving said seat belt tongue to latch said seat belt in a position extending around a vehicle occupant.

* * * * *

UNITED STATES PATENT AND TRADEMARK OFFICE
CERTIFICATE OF CORRECTION

PATENT NO.      : 6,520,588 B1                                                   Page 1 of 1
DATED           : February 18, 2003
INVENTOR(S)     : Craig A. Busch It is certified that error appears in the above-identified patent and that said Letters Patent is hereby corrected as shown below:

<u>Column 8,</u>
Line 9, after "said" (2nd occurrence), delete "channel being" and insert -- central --.
Line 10, delete "defined" and insert -- defines --.

Signed and Sealed this

Eleventh Day of November, 2003

JAMES E. ROGAN
*Director of the United States Patent and Trademark Office*